United States Patent
Knight et al.

(10) Patent No.: US 8,700,564 B2
(45) Date of Patent: Apr. 15, 2014

(54) METHODS AND APPARATUSES FOR PRESENTING INFORMATION ASSOCIATED WITH A TARGET TO A USER

(75) Inventors: David Knight, Belmont, CA (US); Elaine Montgomery, Aberdeen (GB); Chris Daniels, San Jose, CA (US); Linda Wu, Sunnyvale, CA (US); Ilan Kasan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 888 days.

(21) Appl. No.: 11/458,244

(22) Filed: Jul. 18, 2006

(65) Prior Publication Data

US 2007/0265993 A1   Nov. 15, 2007

Related U.S. Application Data

(60) Provisional application No. 60/746,151, filed on May 1, 2006.

(51) Int. Cl.
*G06F 17/00* (2006.01)

(52) U.S. Cl.
USPC ............... 707/608; 434/365; 463/40; 463/41; 463/42; 463/43

(58) Field of Classification Search
USPC ................... 463/1, 6, 40–42, 30–33; 715/753; 379/88.14; 753/753; 709/206; 345/854, 345/762; 707/607, 608, 609; 434/365
See application file for complete search history.

(56) References Cited

U.S. PATENT DOCUMENTS

| | | | | |
|---|---|---|---|---|
| 5,689,708 A * | 11/1997 | Regnier et al. | ................. | 709/229 |
| 5,696,965 A * | 12/1997 | Dedrick | ......................... | 709/203 |
| 5,708,780 A | 1/1998 | Levergood et al. | | |
| 5,717,923 A * | 2/1998 | Dedrick | ................................ | 1/1 |
| 6,476,833 B1 * | 11/2002 | Moshfeghi | ..................... | 715/854 |
| 6,654,034 B1 * | 11/2003 | Kanevsky et al. | ............ | 715/764 |
| 6,788,933 B2 | 9/2004 | Boehmke et al. | | |
| 7,209,957 B2 * | 4/2007 | Patron et al. | .................. | 709/208 |
| 7,275,215 B2 | 9/2007 | Werndorfer et al. | | |
| 7,533,345 B2 * | 5/2009 | Krebs | ........................... | 715/745 |
| 7,640,336 B1 * | 12/2009 | Lu et al. | ........................ | 709/224 |
| 2004/0017396 A1 | 1/2004 | Werndorfer et al. | | |
| 2004/0186746 A1 | 9/2004 | Angst et al. | | |
| 2004/0243485 A1 | 12/2004 | Borenstein et al. | | |
| 2005/0165785 A1 * | 7/2005 | Malkin et al. | .................... | 707/10 |
| 2005/0289642 A1 | 12/2005 | Pacholec et al. | | |
| 2006/0053375 A1 | 3/2006 | Humpleman et al. | | |
| 2006/0242267 A1 * | 10/2006 | Grossman | ..................... | 709/218 |
| 2006/0282426 A1 | 12/2006 | Spears | | |
| 2008/0015878 A1 | 1/2008 | Feng et al. | | |

FOREIGN PATENT DOCUMENTS

CN              1744557 A           3/2006

OTHER PUBLICATIONS

U.S. Appl. No. 60/746,151, filed May 1, 2006, entitled Methods and Apparatuses for Presenting Information Associated With a Target to a User, by David Knight, et al., 32 pages.
PCT Notification of Transmittal of the International Search Report and the Written Opinion of the International Searching Authority, or the Declaration, International Application No. PCT/US07/67957, International Filing Date May 1, 2007, Date of Mailing Sep. 15, 2008, 7 pages.
English translation of Office Action in co-pending Chinese Application No. 200780008741.2, issued Mar. 12, 2012.

* cited by examiner

*Primary Examiner* — Ronald Laneau
*Assistant Examiner* — Ross Williams

(57) ABSTRACT

In one embodiment, the methods and apparatuses detect a plurality of targets; select one of the plurality of targets as a selected target; detect a profile associated with the selected target; and display information associated with the selected target, wherein the information is referenced in the profile associated with the selected target.

10 Claims, 8 Drawing Sheets

METHODS AND APPARATUSES FOR PRESENTING INFORMATION ASSOCIATED WITH A TARGET TO A USER

RELATED APPLICATION

The present invention is related to, and claims the benefit of U.S. Provisional Application No. 60/746,151, filed on May 1, 2006 entitled "Methods and Apparatuses For Presenting Information Associated with a Target to a User," by Elaine Montgomery, Chris Daniels, Linda Wu, Ilan Kasan, and David Knight.

FIELD OF INVENTION

The present invention relates generally to presenting information and, more particularly, to presenting information associated with a target to a user.

BACKGROUND

Systems to present information to a user are utilized by many people. For example, instant messaging chatting typically displays chat dialogue to the user. In some instances, this chat dialogue includes text that is created by the user and another individual.

SUMMARY

In one embodiment, the methods and apparatuses detect a plurality of targets; select one of the plurality of targets as a selected target; detect a profile associated with the selected target; and display information associated with the selected target, wherein the information is referenced in the profile associated with the selected target.

BRIEF DESCRIPTION OF THE DRAWINGS

The accompanying drawings, which are incorporated in and constitute a part of this specification, illustrate and explain one embodiment of the methods and apparatuses for presenting information associated with a target to a user.

In the drawings.

DETAILED DESCRIPTION

The following detailed description of the methods and apparatuses for presenting information associated with a target to a user refers to the accompanying drawings. The detailed description is not intended to limit the methods and apparatuses for presenting information associated with a target to a user. Instead, the scope of the methods and apparatuses for presenting information associated with a target to a user is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

In one embodiment, the methods and apparatuses for presenting information associated with a target to a user allow information associated with a target to be viewed by a user. Further, the user is capable of selectively accessing one of many targets. In one embodiment, the target is associated with a corresponding profile that identifies the information associated with the target and the format in which the information is to be presented to the user.

Figure 1:
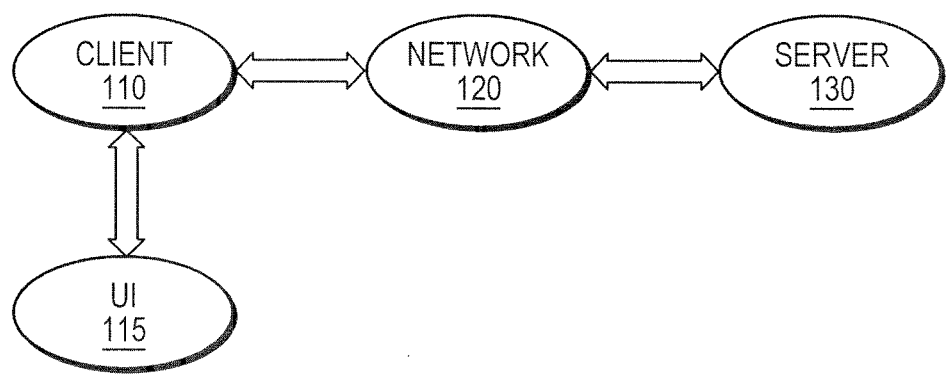
FIG. 1 is a diagram illustrating an environment within which the methods and apparatuses for presenting information associated with a target to a user are implemented.

FIG. 1 is a diagram illustrating an environment within which the methods and apparatuses for presenting information associated with a target to a user are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of selectively controlling a remote device below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
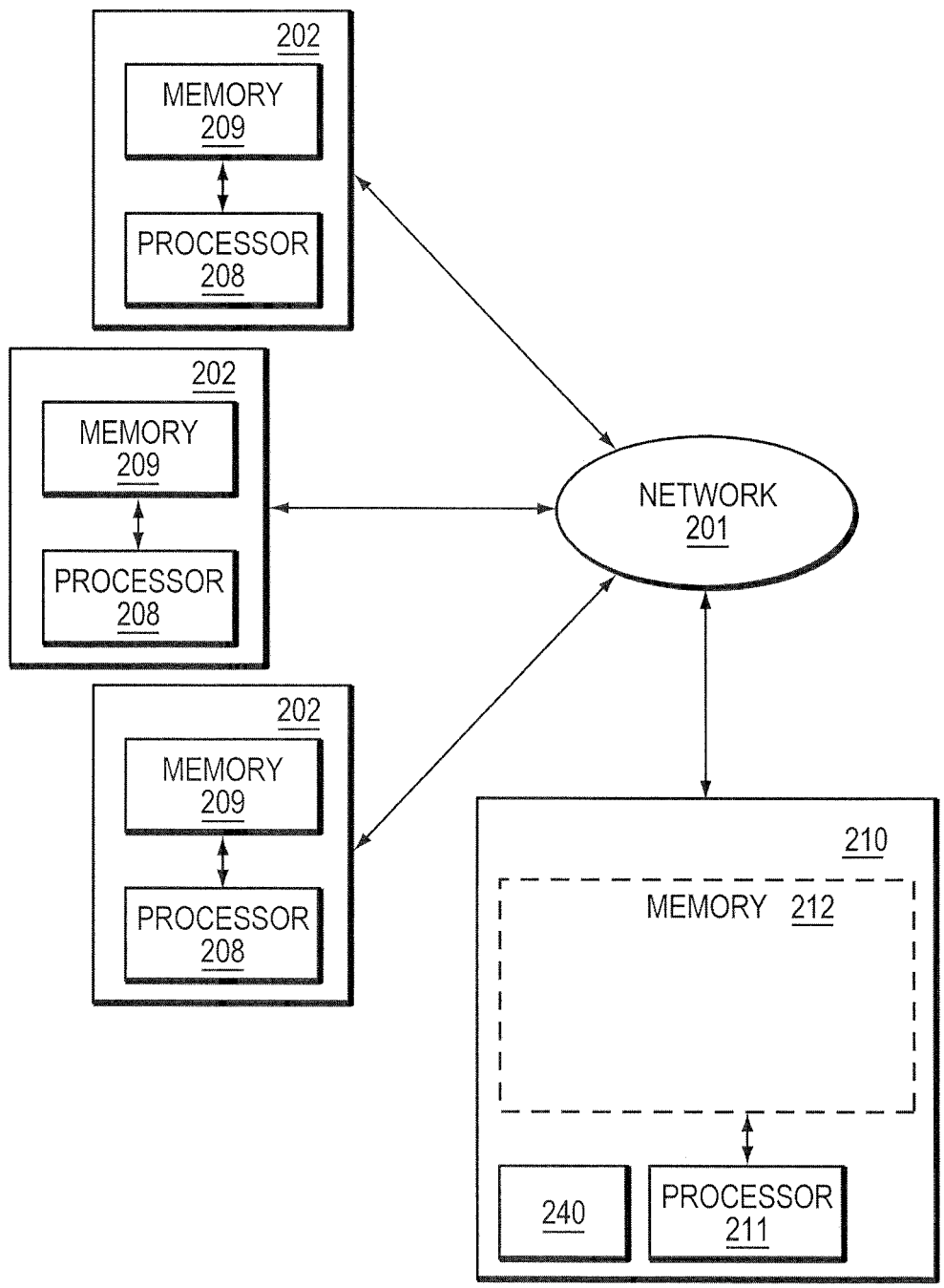
FIG. 2 is a simplified block diagram illustrating one embodiment in which the methods and apparatuses for presenting information associated with a target to a user are implemented.

FIG. 2 is a simplified diagram illustrating an exemplary architecture in which the methods and apparatuses for presenting information associated with a target to a user are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for presenting information associated with a target to a user. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on presenting information associated with a target to a user as determined using embodiments described below.

Figure 3:
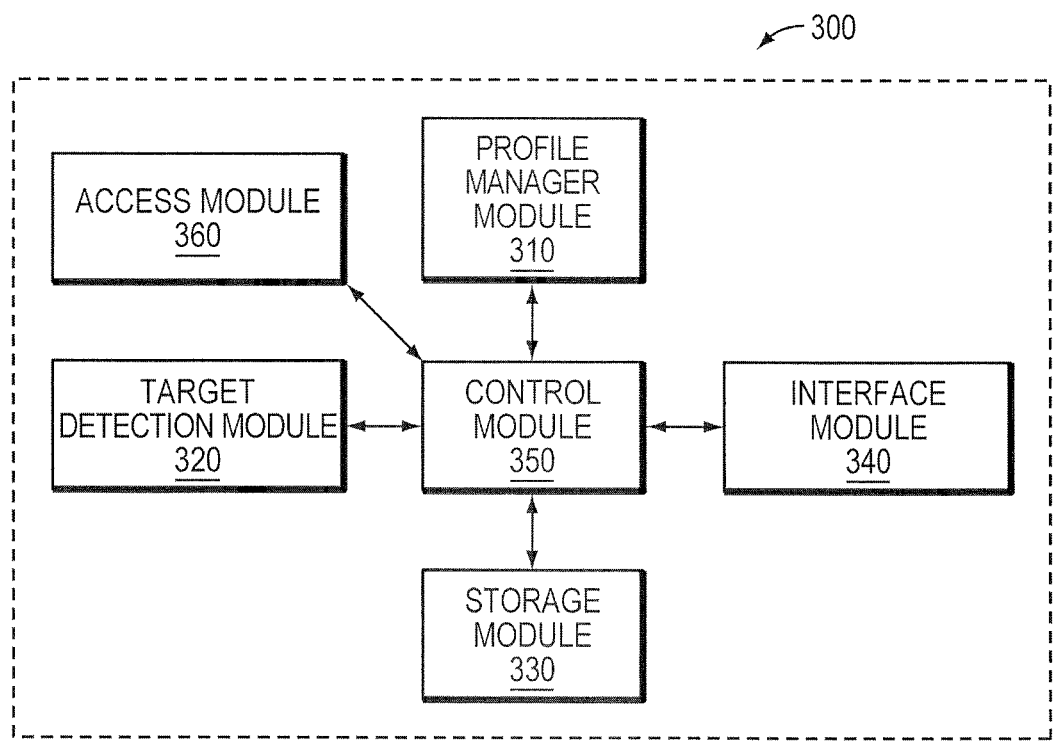
FIG. 3 is a simplified block diagram illustrating a system, consistent with one embodiment of the methods and apparatuses selectively controlling a remote device.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a profile manager module 310, a target detection module 320, a storage module 330, an interface module 340, a control module 350, and an access module 360.

In one embodiment, the control module 350 communicates with the profile manager module 310, the target detection module 320, the storage module 330, the interface module 340, the control module 350, and the access module 360. In one embodiment, the control module 350 coordinates tasks, requests, and communications between the profile manager module 310, the target detection module 320, the storage module 330, the interface module 340, the control module 350, and the access module 360.

In one embodiment, the profile manager module 310 organizes and tracks the profiles. In one embodiment, each profile corresponds to a device. In another embodiment, each profile corresponds with a target.

In one embodiment, the target detection module 320 detects and identifies the identity of the target. In one embodiment, the target detection module 320 detects the identity of targets that are accessible to the user.

In another embodiment, the target detection module 320 also detects the status of the target. A target status includes being available, busy, in a meeting, and the like.

In one embodiment, the storage module 330 stores a record including a profile associated with the each target. An exemplary profile is shown in a record 400 within FIG. 4.

In one embodiment, the interface module 340 detects input from a user. For example, when a user signs into a profile, the interface module 340 recognizes "friends" or "buddies" or available targets of the user from the profile.

In one embodiment, the access module 360 monitors the input from the user through the interface module and selectively allows the user to access other targets based on the profile associated with the user and the profile associated with each target accessed by the user. Further, the access module 360 also selectively allows the user to access customized information associated with each target.

The system 300 in FIG. 3 is shown for exemplary purposes and is merely one embodiment of the methods and apparatuses for presenting information associated with a target to a user. Additional modules may be added to the system 300 without departing from the scope of the methods and apparatuses for presenting information associated with a target to a user. Similarly, modules may be combined or deleted without departing from the scope of the methods and apparatuses for presenting information associated with a target to a user.

Figure 4:
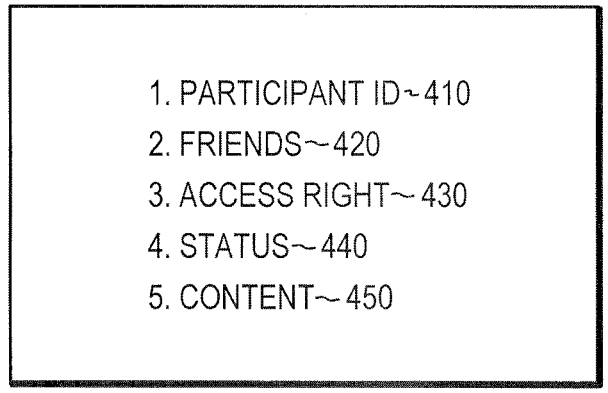
FIG. 4 is an exemplary record for use with the methods and apparatuses for presenting information associated with a target to a user.

FIG. 4 illustrates an exemplary record 400 for use with the methods and apparatuses for presenting information associated with a target to a user. In one embodiment, the record 400 illustrates an exemplary record associated with the initiation and participation of a user with a remote device.

In one embodiment, there are multiple records such that each record 400 is associated with a particular user. Further, each user may correspond with multiple records wherein each record 400 is associated with a particular profile associated with the user. In one embodiment, each record 400 is also associated with a particular device.

In one embodiment, the record 400 includes a participant identification field 410, a friends field 420, an access rights field 430, a status field 440, and a content field 450. In one embodiment, the record 400 resides within the client 110. In another embodiment, the record 400 resides within the server 130.

In one embodiment, the participant identification field 410 includes information related to the identity of the user. In one embodiment, the participant identification field 410 comprises an IM identifier associated with the user.

In another embodiment, the participant identification field 410 includes information related to the identity of the device. In one embodiment, the participant identification field 410 comprises a serial number associated with the device.

In one embodiment, the friends field 420 includes a listing of friends or buddies that is associated with the particular profile. For example, if the profile is associated with a particular user, then the listing of friends indicates devices or other users that are associated with the particular user. In some instances, these devices and/or users have allowed the particular user to have access to and control over corresponding devices.

For example, if the profile is associated with a particular device, then the listing of friends indicates devices or other users that are associated with the particular device. In some instances, these devices and/or users have allowed the particular device to have access to and control over corresponding devices.

In one embodiment, the friends or buddies listing within the friends field 420 includes a potential target identified by the user. For example, each of the friends or buddies may be selected by the user as a target.

In one embodiment, the devices listed within the friends field 420 are incorporated within a device list. In one embodiment, this device list represents devices that are available to another device.

In one embodiment, the access rights field 430 designates the type of access and control the user or device associated with the profile has for respective devices associated with the friends field 420.

In one embodiment, the type of access and control rights include viewing content, downloading content, changing configurations, deleting content, adding content, deleting applications, adding applications, modifying applications, and the like.

In another embodiment, the types of applications that can be accessed may also be specified. For example, an Oracle® application may be specified as the sole application that can be accessed through the remote device. In this case, only documents utilized by the specified Oracle® application on the remote device can be accessed. In one embodiment, multiple applications may be specified.

In one embodiment, the status field 440 allows a particular device or particular user that is listed within the friends field 420 to have a current status associated with that entity. For example, the status is detected through the device detection module 320. The status includes being available, busy, in a meeting, out to lunch, away from my desk, idle, unavailable, and the like.

In one embodiment, the content field 450 identifies content that describes the entities described in the friends field 420. The content can include text, graphics, and/or audio data.

In one embodiment, the content field 450 identifies content that is stored in multiple locations. Further, the content field 450 identifies content that is stored within multiple types of databases. For example, the content identified by the content field 450 includes content stored within an Oracle database and a separate Outlook calendar.

Figure 5:
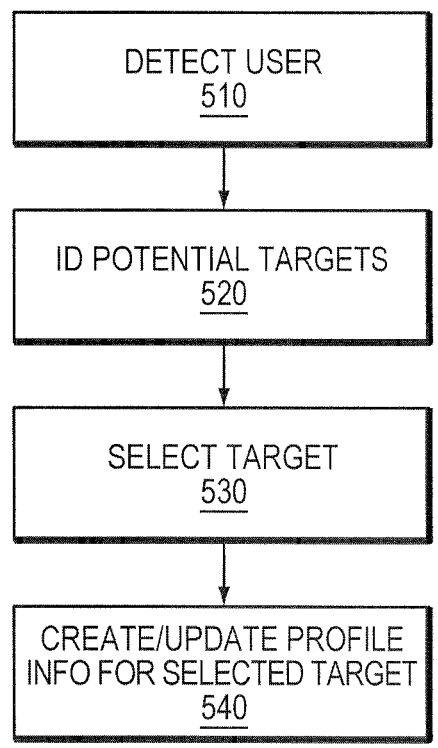
FIG. 5 is a flow diagram consistent with one embodiment of the methods and apparatuses for presenting information associated with a target to a user.
Figure 6:
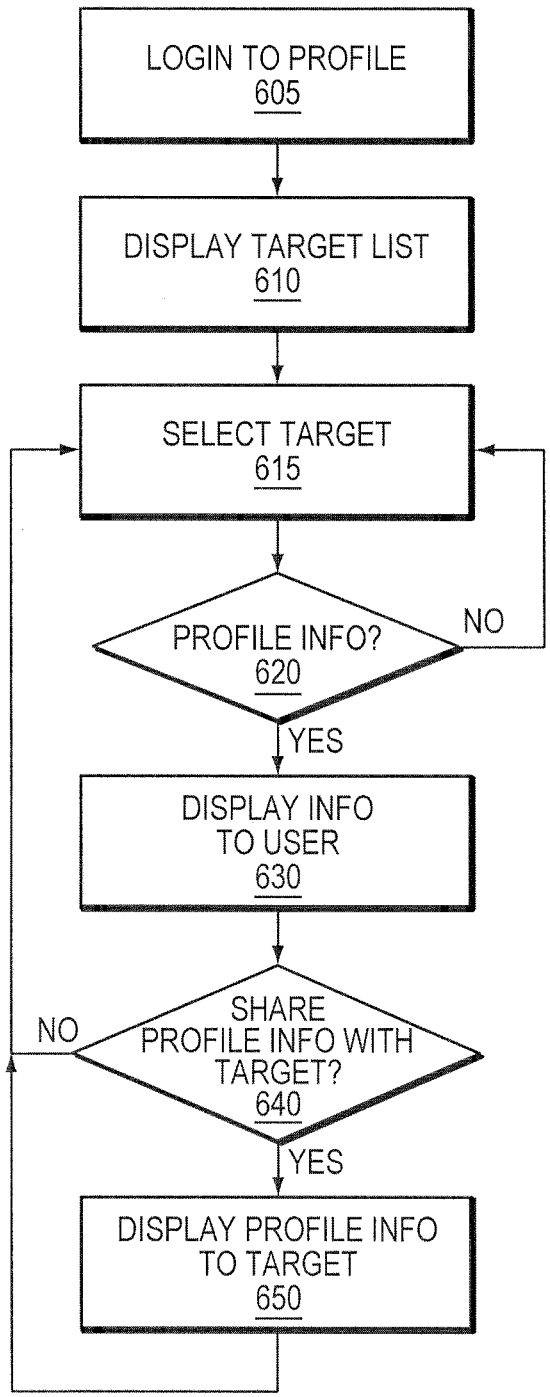
FIG. 6 is a flow diagram consistent with one embodiment of the methods and apparatuses for presenting information associated with a target to a user.
Figure 7:
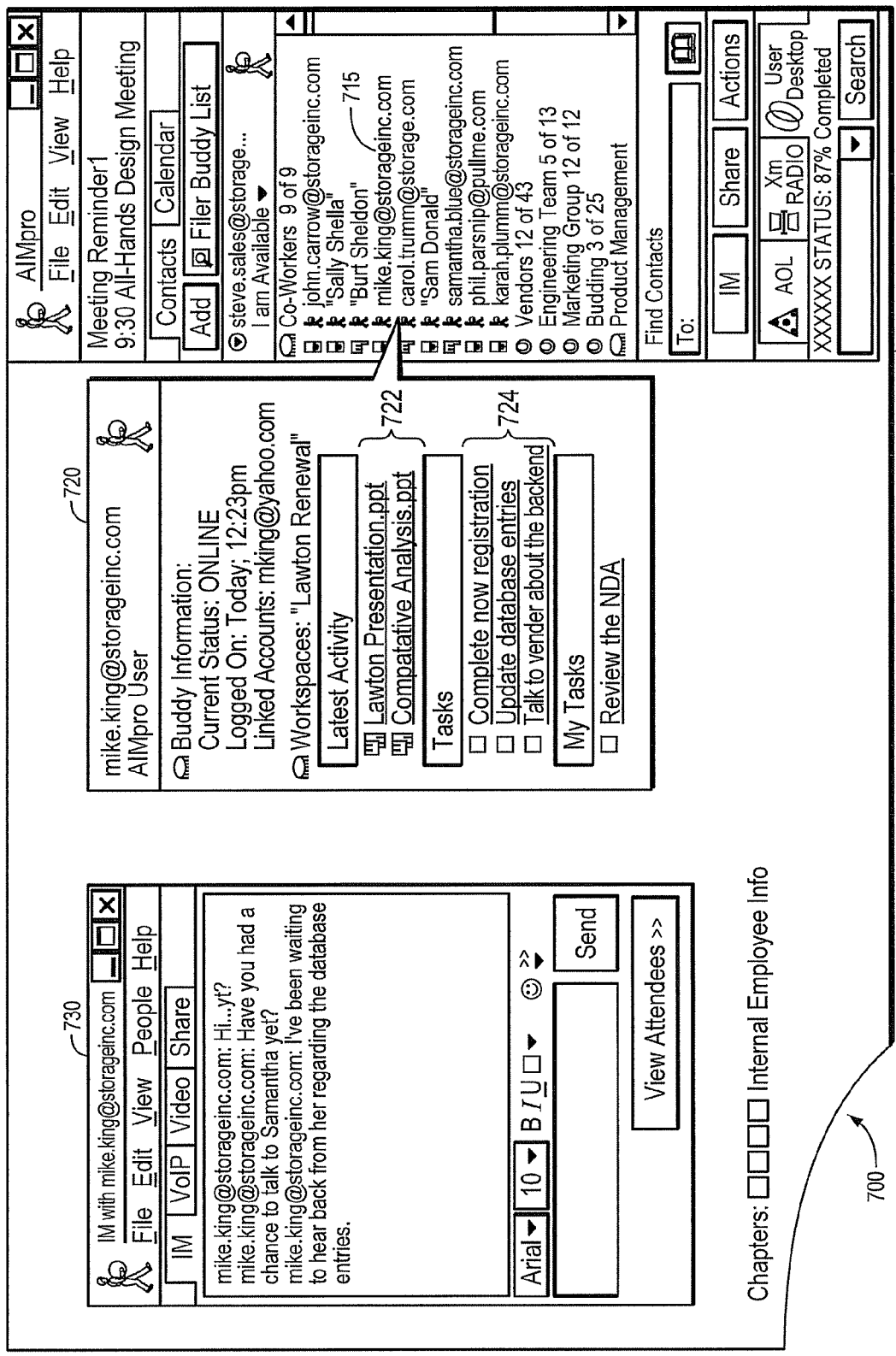
FIG. 7 is a screen shot consistent with one embodiment of the methods and apparatuses for presenting information associated with a target to a user.

The flow diagrams as depicted in FIGS. 5-7 are one embodiment of the methods and apparatuses for presenting information associated with a target to a user. The blocks within the flow diagrams can be performed in a different sequence without departing from the spirit of the methods and apparatuses for presenting information associated with a target to a user. Further, blocks can be deleted, added, or combined without departing from the spirit of the methods and apparatuses for presenting information associated with a target to a user.

The flow diagram in FIG. 5 illustrates forming a profile associated with a user according to one embodiment of the invention.

In Block 510, a user is detected. In one embodiment, the user is identified through a login identification that uniquely identifies that individual user. In another embodiment, the user utilizes a password in conjunction with the login identification to authenticate the user as an authorized party.

In one embodiment, a profile is associated with the user. An exemplary profile is shown as the record 400 in FIG. 4.

In Block 520, potential targets are identified. In one embodiment, the potential targets are associated with the profile corresponding to the user. In another embodiment, the potential targets include anyone that can be contacted by the user. In one embodiment, a target represents an individual user. In another embodiment, the target represents an individual device.

In Block 530, a target is selected from the potential targets identified device in the Block 520.

In Block 540, information associated with the selected target is provided. In one embodiment, the information is utilized to update a profile associated with the selected target. In another embodiment, the information is utilized to create a profile associated with the target. In one embodiment, the information is related to the selected target and includes items such as tasks, notes, calendar items, spreadsheets, documents, graphics, pictures, and the like.

The flow diagram in FIG. 6 illustrates accessing information associated with a target according to one embodiment of the invention.

In Block 605, a user accesses a user profile associated with the user. In one embodiment, the user identifies the user profile through a login identification. Further, the user authenticates authorization to the user profile by providing a predetermined password associated with the user profile. In one embodiment, the user may be associated with multiple user profiles.

In Block 610, a target list is displayed. In one embodiment, the target list includes other users and/or devices that are available to be viewed by the user through the user profile.

In one embodiment, the status of the devices and/or users is shown through the target list and represents whether each device and/or user is available, unavailable, and the like.

In one embodiment, the target list is formatted as a textual list that identifies the identity of the device and/or user.

In another embodiment, the target list is embodied within a graphical user interface that utilizes icons to graphically represent each device and/or user shown on the target list.

In Block 615, a target shown within the target list is selected.

In Block 620, a determination is made regarding whether there is information associated with the selected target. If there is information associated with the target device, then this information is displayed to the user in Block 630. If there is no information associated with the selected target, then an additional selected target is identified within the Block 615.

In the Block 630, the information associated with the selected target is also identified in one embodiment. For example, the information associated with the selected target device may reside in multiple databases such as a CRM database, an Outlook® server, and a document management system. In one embodiment, the information associated with the selected target is gathered and made available to the user. In one embodiment, the information associated with the selected target is modified. Further, the modifications to this information are stored within each respective location. For example, if this information resides among multiple databases, then each of the databases is updated to reflect the modified information.

In Block 640, a determination is made regarding whether the information associated with the selected target is to be shared with the selected target. In one embodiment, the user selects whether the information associated with the selected target should be shared with the selected target each time this information is detected in the Block 640.

In another embodiment, the profile associated with the user is configured to store the user's preference for sharing information associated with the selected target. In one embodiment, the decision on whether to share the associated information depends on each target. Further, the decision on whether to share the associated information also depends on the type of information. For example, personal notes from a CRM database may be chosen to be excluded from sharing.

If the information associated with the target is determined to be shared with the selected target, then the information is displayed to the selected target in Block 650. If the information associated with the selected target is not to be shared, then an additional selected target is identified within the Block 615.

Figure 8:
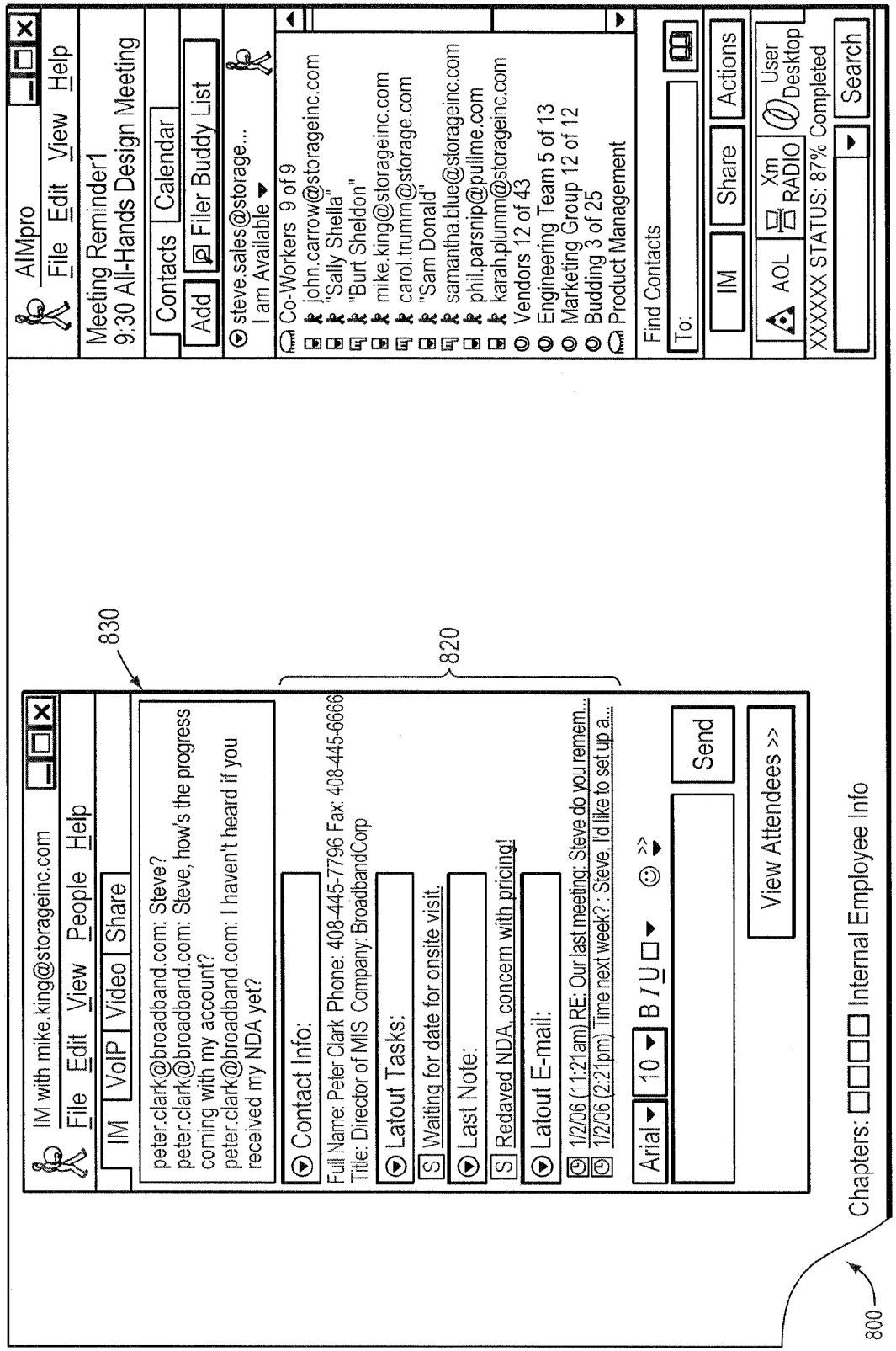
FIG. 8 illustrates a screen shot consistent with one embodiment of the methods and apparatuses for presenting information associated with a target to a user.

FIGS. 7 and 8 illustrate representative screen shots which demonstrate one embodiment of the invention.

FIG. 7 illustrates a screen shot 700 that includes a target list 710, a particular target 715, an information display 720, and an instant messaging display 730.

In one embodiment, the target list 710 includes a listing of targets that correspond to a particular user. Further, the target list 710 may be incorporated within a contact list within an instant messaging application in one embodiment.

In one embodiment, the information display 720 shows information corresponding to a particular target. In this instance, the information display 720 shows information corresponding to the particular target 715. Further, the information display 720 shows information including "latest activity" 722 and "tasks" 724. The latest activity 722 and tasks 724 correspond to the particular target 715.

In one embodiment, the instant messaging display 730 is utilized to provide instant messaging service between the user and the particular target 715.

In one embodiment, the information display 720 is activated by selecting the particular target 715. In one embodiment, the particular target is selected by highlighting the particular target 715 through a cursor. In another embodiment, the particular target is selected by selecting to instant message the particular target 715 through the instant messaging display 730.

FIG. 8 illustrates a screen shot 800 that includes a target list 810, an information display 820, and an instant messaging display 830.

In one embodiment, the target list 810 includes a listing of targets that correspond to a particular user. Further, the target list 810 may be incorporated within a contact list within an instant messaging application in one embodiment.

In one embodiment, the information display 820 shows information corresponding to a particular target. In one instance, the information display 820 shows information including "contact info", "latest tasks", "last note", and "latest emails". This data within the information display 820 corresponds to the particular target.

In one embodiment, the instant messaging display 830 is utilized to provide instant messaging service between the user and the particular target.

In one embodiment, the information display 820 and the instant messaging display 830 are combined within the same window.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
    detecting via a processor a plurality of targets, wherein the plurality of targets represents a listing associated with an instant messaging application;
    receiving via a user interface a selection of one of the plurality of targets as a selected target;
    detecting via the processor a profile associated with the selected target;
    displaying via the user interface information associated with the selected target to a user of an initiating device in a same window as an instant messaging display, wherein the information is referenced in the profile associated with the selected target;
    determining via the processor whether the information referenced in the profile associated with the selected target is to be shared with the selected target based on a type of the information; and
    in response to determining that the information is of a type of information to be shared, sharing with the selected target the information referenced in the profile associated with the selected target.

2. The method according to claim 1 wherein the selected target represents one of a computer, a telephone, a personal digital assistant, a pager, and a person.

3. The method according to claim 1 further comprising displaying the plurality of targets that are accessible via the user interface.

4. The method according to claim 1 wherein the information referenced in the profile associated with the selected target includes one of a document, a spreadsheet, a graphic, an audio signal, a task, and a calendar entry.

5. The method according to claim 1 further comprising collecting the information referenced in the profile associated with the selected target from multiple sources.

6. The method according to claim 5 wherein each of the multiple sources include one of a CRM database, a document management system, and an electronic mail application.

7. The method according to claim 1 further comprising editing the information referenced in the profile associated with the selected target and forming edited information, wherein the information referenced in the profile associated with the selected target is stored in multiple sources.

8. The method according to claim 7 further comprising storing the edited information in each respective source corresponding with the edited information.

9. A system, comprising:
    a processor; and
    a memory configured to store a plurality of software modules executable by the processor, the software modules including,
        a target detection module configured to detect a plurality of targets, wherein the plurality of targets represents a listing associated with an instant messaging application;
        a profile manager module configured to track a profile, wherein the profile includes a representation of information that corresponds to a target and wherein the information is located within multiple sources,
        an interface module configured to receive a selection of one of the plurality of targets as a selected target and to display information associated with the selected target to a user of an initiating device in a same window as an instant messaging display, wherein the information is referenced in the profile associated with the selected target, and
        an access module configured to determine whether the information referenced in the profile associated with the selected target is to be shared with the selected target based on a type of the information,
        wherein, in response to a determination that the information is of a type of information to be shared, the interface module is further configured to share with the selected target the information referenced in the profile associated with the selected target.

10. The system according to claim 9 wherein the software modules further include a storage module configured to store the profile.

* * * * *